United States Patent
Ahn et al.

(10) Patent No.: US 10,804,528 B2
(45) Date of Patent: Oct. 13, 2020

(54) METHOD FOR PREPARING POSITIVE ELECTRODE ACTIVE MATERIAL SLURRY

(71) Applicant: LG CHEM, LTD., Seoul (KR)

(72) Inventors: Byoung-Hoon Ahn, Daejeon (KR); Sang-Hoon Choy, Daejeon (KR); Hyun-Sik Chae, Daejeon (KR)

(73) Assignee: LG Chem, Ltd. (KR)

( * ) Notice: Subject to any disclaimer, the term of this patent is extended or adjusted under 35 U.S.C. 154(b) by 108 days.

(21) Appl. No.: 16/066,470

(22) PCT Filed: Nov. 16, 2017

(86) PCT No.: PCT/KR2017/012961
§ 371 (c)(1),
(2) Date: Jun. 27, 2018

(87) PCT Pub. No.: WO2018/093151
PCT Pub. Date: May 24, 2018

(65) Prior Publication Data
US 2019/0020016 A1 Jan. 17, 2019

(30) Foreign Application Priority Data
Nov. 17, 2016 (KR) .................. 10-2016-0153242

(51) Int. Cl.
| | | |
|---|---|---|
| H01M 4/131 | (2010.01) | |
| H01M 4/525 | (2010.01) | |
| H01M 4/62 | (2006.01) | |
| H01M 4/1391 | (2010.01) | |
| H01M 4/139 | (2010.01) | |
| H01M 4/505 | (2010.01) | |
| H01M 4/02 | (2006.01) | |

(52) U.S. Cl.
CPC .......... *H01M 4/131* (2013.01); *H01M 4/139* (2013.01); *H01M 4/1391* (2013.01); *H01M 4/505* (2013.01); *H01M 4/525* (2013.01); *H01M 4/623* (2013.01); *H01M 4/625* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | |
|---|---|---|
| 2003/0073000 A1 | 4/2003 | Lee et al. |
| 2015/0037672 A1* | 2/2015 | Yang ............. H01M 10/052 429/217 |
| 2015/0044550 A1 | 2/2015 | Park et al. |
| 2015/0364749 A1 | 12/2015 | Kim |
| 2016/0226060 A1* | 8/2016 | Uchida ............ H01M 4/0404 |
| 2016/0329566 A1 | 11/2016 | Jung et al. |
| 2018/0166688 A1 | 6/2018 | Ahn et al. |

FOREIGN PATENT DOCUMENTS

| | | |
|---|---|---|
| CN | 1780034 A | 5/2006 |
| CN | 102738446 A | 10/2012 |
| CN | 106099114 A | 11/2016 |
| JP | 2000-12001 A | 1/2000 |
| JP | 2003-68280 A | 3/2003 |
| JP | 2004-247180 A | 9/2004 |
| JP | 2013-254699 A | 12/2013 |
| KR | 10-2015-0072374 A | 6/2015 |
| KR | 10-2016-0040125 A | 4/2016 |
| KR | 10-2017-0111722 A | 10/2017 |

OTHER PUBLICATIONS

International Search Report (PCT/ISA/210) issued in PCT/KR2017/012961, dated Mar. 6, 2018.
Chinese Search Report for Application No. 201780007552.7, dated Jul. 24, 2020, pp. 1-3.

* cited by examiner

*Primary Examiner* — Wyatt P McConnell
(74) *Attorney, Agent, or Firm* — Lerner, David, Littenberg, Krumholz & Mentlik, LLP

(57) ABSTRACT

Disclosed is a method for preparing positive electrode active material slurry, which includes the steps of: (S1) preparing a positive electrode active material, a linear conductive material, a polymer binder and a solvent; (S2) introducing 40-80% of the prepared polymer binder, the positive electrode active material and the linear conductive material to the solvent, followed by mixing, to obtain a first positive electrode active material slurry; and (S3) further introducing the remaining polymer binder to the first positive electrode active material slurry, followed by mixing, to obtain a second positive electrode active material slurry.

7 Claims, No Drawings

METHOD FOR PREPARING POSITIVE ELECTRODE ACTIVE MATERIAL SLURRY

TECHNICAL FIELD

The present disclosure relates to a method for preparing positive electrode active material slurry. More particularly, the present disclosure relates to a method for preparing positive electrode active material slurry which can improve adhesion.

The present application claims priority to Korean Patent Application No. 10-2016-0153242 filed on Nov. 17, 2016 in the Republic of Korea, the disclosures of which are incorporated herein by reference.

BACKGROUND ART

In general, a lithium secondary battery is provided with a positive electrode having a positive electrode active material layer formed on at least one surface of a positive electrode current collector, a negative electrode having a negative electrode active material layer formed on at least one surface of a negative electrode current collector, and a separator interposed between the positive electrode and the negative electrode so that both electrodes are insulated electrically therebetween. Methods for forming a negative electrode active material layer on a current collector include a method of applying negative electrode active material slurry containing negative electrode active material particles and a binder dispersed in a solvent directly to a current collector and drying the slurry, or a method of applying the negative active material slurry to the top of a separate support, drying the slurry and laminating the film peeled from the support onto a current collector. The binder functions to bind negative electrode active material particles with each other and to retain the binding between the negative electrode active material particles and the current collector, and thus significantly affects the performance of a battery.

Meanwhile, a positive electrode used in a conventional secondary battery is obtained by preparing positive electrode active material slurry containing a positive electrode active material, a conductive material and a binder dispersed in a solvent, and coating the resultant slurry onto a current collector. To improve the energy density of such a positive electrode, use of a linear conductive material having high conductivity has been increased. However, entanglement occurs during the preparation of slurry due to the structural characteristics of the linear conductive material. Since a large amount of binder is present among the entangled liner conductive material, the binder is distributed non-homogeneously in the slurry, resulting in degradation of the adhesion of the positive electrode.

DISCLOSURE

Technical Problem

The present disclosure is designed to solve the problems of the related art, and therefore the present disclosure is directed to providing a method for preparing positive electrode active material slurry which prevents non-homogeneous distribution of a binder in the positive electrode active material slurry and thus can improve the adhesion of the positive electrode.

Technical Solution

In one aspect of the present disclosure, there is provided a method for preparing positive electrode active material slurry, which includes the steps of: (S1) preparing a positive electrode active material, a linear conductive material, a polymer binder and a solvent; (S2) introducing 40-80% of the prepared polymer binder, the positive electrode active material and the linear conductive material to the solvent, followed by mixing, to obtain a first positive electrode active material slurry; and (S3) further introducing the remaining polymer binder to the first positive electrode active material slurry, followed by mixing, to obtain a second positive electrode active material slurry.

Preferably, the first positive electrode active material slurry may have a solid content of 74%-79% and the second positive electrode active material slurry may have a solid content of 71%-73%.

Preferably, the linear conductive material may be at least one selected from the group consisting of carbon nanotubes, carbon nanofibers and graphene.

Preferably, the linear conductive material may be carbon nanotubes.

Preferably, in step (S3), 94-99 wt % of the positive electrode active material, 0.1-5 wt % of the linear conductive material and 0.1-5 wt % of the polymer binder may be dispersed in the second positive electrode active material slurry.

Preferably, the polymer binder may be any one selected from the group consisting of polyvinylidene fluoride-hexafluoropropylene (PVDF-co-HFP), polyvinylidene fluoride (PVDF), polyacrylonitrile, polymethyl methacrylate, styrene-butadiene rubber (SBR) and carboxymethyl cellulose (CMC), or a combination of two or more of them.

Preferably, the positive electrode active material may be a lithium-containing transition metal oxide.

Advantageous Effects

According to an embodiment of the present disclosure, a polymer binder is introduced divisionally to improve the homogeneity of positive electrode slurry and to improve the adhesion of a positive electrode.

BEST MODE

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

According to the present disclosure, a linear conductive material is used as a conductive material. The linear conductive material has an aspect ratio (length of longer axis/length of shorter axis) of 1.5 or more. Such a linear conductive material can improve conductivity but cause entanglement in slurry due to its structural shape. In other words, due to the entanglement of the linear conductive material in slurry, a polymer binder is present among the entangled linear conductive material and thus the polymer binder is dispersed non-homogeneously in the slurry. Thus, there is a problem in that adhesion between a positive electrode active material and a positive electrode current collector is degraded when manufacturing a positive electrode.

According to the present disclosure, the polymer binder is introduced divisionally at a predetermined ratio during the mixing process of positive electrode active material slurry, so that the solid content of slurry may be controlled. In this manner, it is possible to accomplish homogeneous dispersion of the positive electrode active material and polymer binder in the slurry. It can be demonstrated through a test that the positive electrode provides improved adhesion according to the present disclosure.

The method for preparing positive electrode active material slurry according to an embodiment of the present disclosure will be explained hereinafter.

A positive electrode active material, a linear conductive material, a binder polymer and a solvent are prepared (S1). Next, 40-80% of the polymer binder, the positive electrode active material and the linear conductive material are introduced to the solvent to obtain a first positive electrode active material slurry (S2). Then, the remaining polymer binder is further introduced to the resultant first positive electrode active material slurry, followed by mixing, to obtain a second positive electrode active material slurry (S3). During the first mixing process, the positive electrode active material is dispersed sufficiently in the slurry. In addition, the polymer binder is distributed homogeneously among the slurry particles during the second mixing process, thereby providing improved adhesion to the positive electrode.

According to the present disclosure, the polymer binder is introduced divisionally at the above-defined ratio so that the first positive electrode active material slurry may have a solid content of 74-79% and the second positive electrode active material slurry may have a solid content of 71-73%.

In step (S3), 94-99 wt % of the positive electrode active material, 0.1-5 wt % of the linear conductive material and 0.1-5 wt % of the polymer binder may be dispersed in the second positive electrode active material slurry. Preferably, 98 wt % of the positive electrode active material, 0.5 wt % of the linear conductive material and 1.5 wt % of the polymer binder may be dispersed.

According to the present disclosure, the linear conductive material provides high conductivity and may include at least one selected from the group consisting of carbon nanotubes, carbon nanofibers and graphene, carbon nanotubes being preferred.

According to the present disclosure, the polymer binder is an ingredient that helps binding between the positive electrode active material and the conductive material and binding to a current collector. Particular examples of the polymer binder that may be used include polyvinylidene fluoride-hexafluoropropylene (PVDF-co-HFP), polyvinylidene fluoride (PVDF), polyacrylonitrile, polymethyl methacrylate, styrene-butadiene rubber (SBR) and carboxymethyl cellulose (CMC), polyvinylidene fluoride (PVDF) being preferred.

The positive electrode active material may be a lithium-containing transition metal oxide. Particular examples of the positive electrode active material include any one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x <1.3) and $Li_xFePO_4$ (0.5<x<1.3), or a combination of two or more of them. In addition, the lithium-containing transition metal oxide may be coated with a metal, such as aluminum, or metal oxide. Further, besides such lithium-containing transition metal oxides, sulfides, selenides and halides may be used.

The solvent may include at least one selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimetoxyethane, diethoxyethane, tetrahydrofuran, N-methyl-2-pyrrolidone (NMP), ethyl methyl carbonate (EMC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate and butyl propionate.

Hereinafter, the present disclosure will be explained in detail with reference to Examples. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

First, 300 g of NCM as a positive electrode active material, 1.531 g of carbon nanotubes (CNT) as a linear conductive material, a binder solution containing 4.592 g of polyvinylidene fluoride (PVdF) dissolved therein to a solubility of 6, and N-methyl-2-pyrrolidone (NMP) as a solvent were prepared.

Next, 80% of the binder solution, the positive electrode active material and the linear conductive material were introduced to the solvent and dispersed by using a conventional homogenizer under 3,000 rpm for 50 minutes to obtain a first positive electrode active material slurry having a solid content of 74%.

Then, the remaining binder solution was introduced to the first positive electrode active material slurry and dispersed under 3,000 rpm for 10 minutes to obtain a second positive electrode active material having a solid content of 72%.

The second positive electrode slurry was applied to aluminum foil having a thickness of 20 µm with a loading amount of 480 mg/25 cm², followed by drying and pressing, to obtain a positive electrode.

Example 2

A positive electrode was obtained in the same manner as Example 1, except that 60% of the polymer binder was introduced to obtain the first positive electrode active material slurry having a solid content of 76%.

Example 3

A positive electrode was obtained in the same manner as Example 1, except that 40% of the polymer binder was introduced to obtain the first positive electrode active material slurry having a solid content of 78.2%.

Comparative Example

First, 300 g of NCM as a positive electrode active material, 1.531 g of CNT as a linear conductive material, a binder solution containing 4.592 g of PVdF dissolved therein to a solubility of 6, and NMP as a solvent were prepared.

Next, the positive electrode active material, the linear conductive material and the binder solution were introduced to the solvent and dispersed by using a conventional homogenizer under 3,000 rpm for 50 minutes to obtain a second positive electrode active material slurry having a solid content of 72%.

The second positive electrode slurry was applied to aluminum foil having a thickness of 20 μm with a loading amount of 480 mg/25 cm², followed by drying and pressing, to obtain a positive electrode.

Test for Positive Electrode Adhesion

Each of the positive electrodes according to Examples 1-3 and Comparative Example was pressed with a size of 10×150 mm and the pressed coated surface of the positive electrode was attached onto glass by using a double-sided tape to obtain a sample. The sample was determined for the force upon 180° peel by using a UTM adhesion tester. The results are shown in the following Table 1.

TABLE 1

|  | Ex. 1 | Ex. 2 | Ex. 3 | Comp. Ex. |
| --- | --- | --- | --- | --- |
| Adhesion (gf/10 mm) | 5.7 | 10.4 | 16.1 | 4.7 |

Referring to Table 1, each of Examples 1-3 in which the binder is introduced divisionally shows higher adhesion as compared to Comparative Example. It can be seen that adhesion of an electrode is improved, as the amount of a binder introduced in the step of preparing the second positive electrode slurry is increased.

Determination of Positive Electrode Conductivity

Each of the positive electrodes according to Examples 1-3 and Comparative Example was used to determine the conductivity of the positive electrode. The results are shown in the following Table 2. The conductivity of the positive electrode was determined by using a 4-point probe (CMT-SR2000N available from AIT Company). The positive electrode was pressed to a size of 50×50 mm and the surface of the positive electrode was subjected to a 4-probe contact method at an interval of 1 mm. The results of conductivity measurement are shown in the following Table 2.

TABLE 2

|  | Ex. 1 | Ex. 2 | Ex. 3 | Comp. Ex. |
| --- | --- | --- | --- | --- |
| Conductivity ($10^{-3}$ S/cm) | 7.8 | 8.9 | 9.6 | 7.2 |

Referring to Table 2, each of Examples 1-3 shows higher conductivity as compared to Comparative Example. It is thought that this is because the adhesion between the positive electrode coating layer and the current collector is improved so that the current flow may be facilitated at the interface between the coating layer and the current collector.

Determination of Cycle Characteristics

Carbon powder as a negative electrode active material, carboxymethyl cellulose as a thickener, styrene-butadiene rubber as a binder and carbon black as a conductive material were added to water as a solvent at a weight ratio of 96:1:2:1 to obtain negative electrode slurry. The negative electrode slurry was applied to copper (Cu) foil as a negative electrode current collector, followed by drying, and roll pressing was carried out to obtain a negative electrode.

The resultant negative electrode was allowed to face each of the positive electrodes according to Examples 1-3 and Comparative Example, and then a separator having a tri-layer structure of polypropylene/polyethylene/polypropylene (PP/PE/PP) was interposed between the positive electrode and the negative electrode to obtain an electrode assembly. The electrode assembly was received in a battery casing. Then, a non-aqueous electrolyte including a non-aqueous organic solvent having a composition of ethylene carbonate (EC):ethylmethyl carbonate (EMC):dimethyl carbonate (DMC)=3:3:4 (volume ratio) and containing $LiPF_6$ as a lithium salt in an amount of 1 mol/L based on the total weight of the non-aqueous electrolyte was injected to obtain a lithium secondary battery.

The lithium secondary batteries obtained by using the positive electrodes according to Examples 1-3 and Comparative Example were charged to 4.2 V under a constant current condition of 1.0 C at 45° C., charged under a constant voltage condition to a current density corresponding to 0.05 C., and were discharged to 2.5 V under a constant current condition at a current density corresponding to 1.0 C. Under the above-mentioned charging/discharging conditions, each battery was tested for life characteristics at the $300^{th}$ cycle. The results are shown in the following Table 3.

TABLE 3

|  | Ex. 1 | Ex. 2 | Ex. 3 | Comp. Ex. |
| --- | --- | --- | --- | --- |
| 45° C. cycle capacity (%, at $300^{th}$ cycle) | 64.7 | 70.6 | 72.3 | 62.9 |

Referring to Table 3, each of the batteries according to Examples 1-3 shows excellent life characteristics as compared to Comparative Example. It can be seen that it is possible to improve the adhesion and conductivity of a positive electrode and to provide improved performance to a battery depending on whether a binder is introduced and mixed divisionally or not under the same composition.

The present disclosure has been described in detail. However, it should be understood that the detailed description is for illustrative purposes only and it will be apparent to those skilled in the art that various changes and modifications may be made without departing from the disclosure and scope of the invention as defined in the following claims. Thus, the specific examples of the disclosure are given by way of illustration only and do not limit the scope of the present disclosure. The scope of the present disclosure is defined by the following claims and various changes and modifications within the scope of the disclosure will become apparent to those skilled in the art from this detailed description.

What is claimed is:

1. A method for preparing positive electrode active material slurry, which comprises the steps of:
   (1) preparing a positive electrode active material, a linear conductive material, a polymer binder and a solvent;
   (S2) introducing 40-80% of the prepared polymer binder, the positive electrode active material and the linear conductive material to the solvent, followed by mixing, to obtain the a positive electrode active material slurry; and
   (S3) further introducing the remaining polymer binder to the first positive electrode active material slurry, followed by mixing, to obtain a homogeneous second positive electrode active material slurry.

2. The method for preparing positive electrode active material slurry according to claim 1, wherein the first positive electrode active material slurry has a solid content of 74%-79% and the second positive electrode active material slurry has a solid content of 71%-73%.

3. The method for preparing positive electrode active material slurry according to claim 1, wherein the linear conductive material is at least one selected from the group consisting of carbon nanotubes, carbon nanofibers and graphene.

4. The method for preparing positive electrode active material slurry according to claim 1, wherein the linear conductive material comprises carbon nanotubes.

5. The method for preparing positive electrode active material slurry according to claim 1, wherein the second positive electrode active material slurry obtained in step (S3) includes 94-99 wt % of the positive electrode active material, 0.1-5 wt % of the linear conductive material and 0.1-5 wt % of the polymer binder based on a total weight of the second positive electrode active material slurry.

6. The method for preparing positive electrode active material slurry according to claim 1, wherein the polymer binder is any one selected from the group consisting of polyvinylidene fluoride-hexafluoropropylene (PVDF-co-HFP), polyvinylidene fluoride (PVDF), polyacrylonitrile, polymethyl methacrylate, styrene-butadiene rubber (SBR) and carboxymethyl cellulose (CMC), or a combination of two or more of them.

7. The method for preparing positive electrode active material slurry according to claim 1, wherein the positive electrode active material is a lithium-containing transition metal oxide.

\* \* \* \* \*